Sept. 11, 1945.  L. S. WITHERSPOON  2,384,718
HANDLE FOR CONTAINERS
Filed Dec. 12, 1942   2 Sheets-Sheet 1

INVENTOR,
Lillian S. Witherspoon

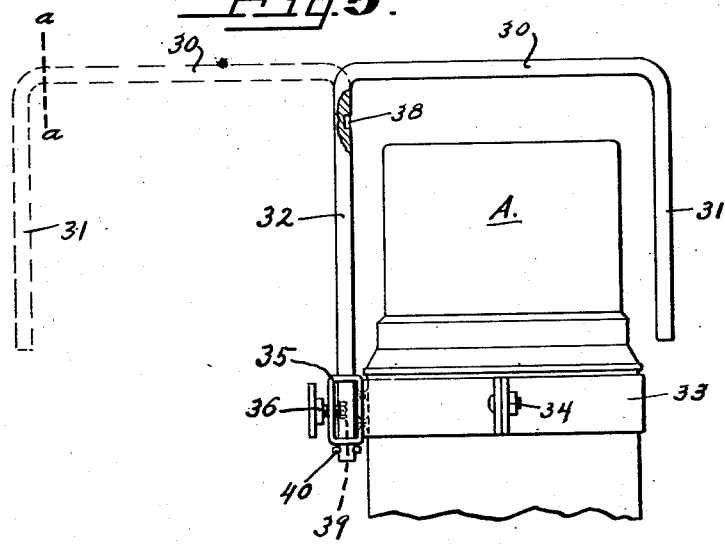
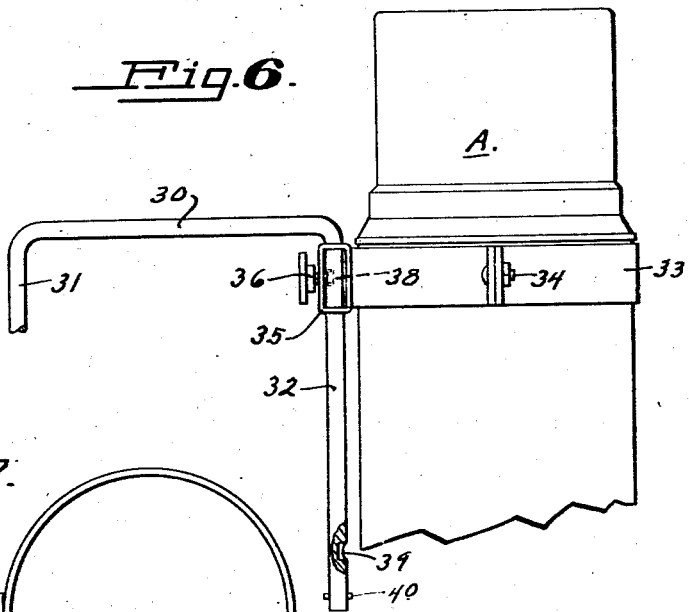
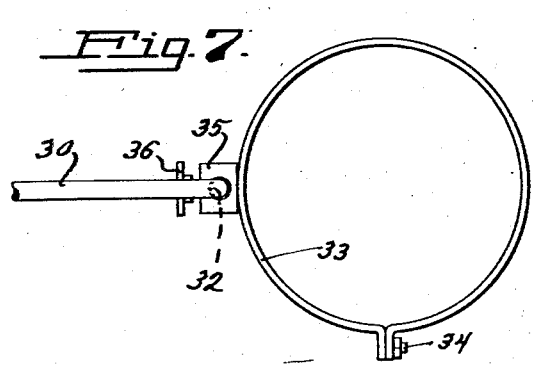

Patented Sept. 11, 1945

2,384,718

UNITED STATES PATENT OFFICE 2,384,718

HANDLE FOR CONTAINERS

Lillian S. Witherspoon, Los Angeles, Calif.

Application December 12, 1942, Serial No. 468,799

4 Claims. (Cl. 220—94)

This invention relates to handles for containers, and the like, and more particularly to a handle capable of functioning in two positions with respect to a container, namely, as a bail and as a side handle.

The novel handle is in the nature of an improvement over my earlier United States Letters Patent No. 1,586,020, issued May 25, 1926, entitled "Handle for containers." The present invention contemplates a dual-position handle for a container, such, for example, as a vacuum bottle, which is simple of design, very compact and extremely easy to manipulate.

Among the objects of the invention are the provision of a handle attachment to be employed in conjunction with containers, making it possible to lift and carry a container, such as a vacuum bottle, or pour the contents thereof as from a pitcher with a minimum of effort and discomfort, by simply shifting the position of the attachment from bail position to a side handle position; to provide a handle attachment for use as a bail or as a side position handle for a container which has a single pivotal connection with the said container; to provide a handle attachment capable of duel use as a handle or a bail; which is simple in design, easy to manufacture and marketable at a very nominal price; and to provide such attachment with locking mechanism to secure simply and effectively the handle or bail in either of its operative positions. Further objects and advantages will become apparent upon reference to the specification and accompanying illustrative drawings. In the drawings similar characters of reference represent corresponding parts in the several views.

Having reference to the accompanying drawings:

Fig. 5 is a side elevation of a modified form of the invention, with the handle locked in bail position and showing the handle in intermediate position in broken lines.

Fig. 6 is a similar view to Fig. 5, with the handle shown locked in side position.

Fig. 7 is a top plan of the handle and bail as shown in Fig. 6.

Figure 1:
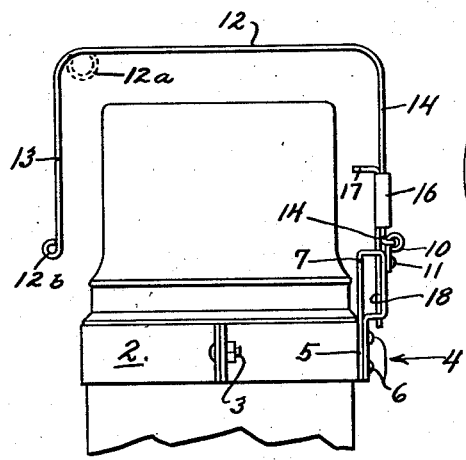
Fig. 1 is a side elevation of one form of the invention, showing the handle locked in bail position.
Figure 2:
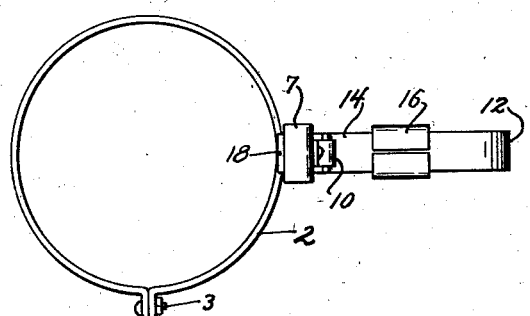
Fig. 2 is a top plan view of the bail and handle in side position of the form of Fig. 1.

Referring to the drawings, Figs. 1, 2, 3 and 4 illustrate the handle device, wherein base member or band 2 is suitably secured to container A, such as a vacuum bottle or the like, as at 3. The base member or band 2 supports a bracket member, generally indicated at 4, preferably made of strap metal, which comprises a support member 5, suitably attached to the band at 6 which supports a rectangular keeper 7 above the top edge of said band, said keeper having two parallel sides and parallel top and bottom walls. The side walls are provided with oppositely disposed, horizontally aligned slits 8, adjacent to the bottom portion thereof. The top and bottom walls are provided with oppositely disposed, vertically aligned slits 9. The purpose of said keeper and its slits 8 and 9 will shortly appear. A link 10 is pivoted at one end to a side wall of the rectangular keeper 7, as at 11, and the other end is hingedly attached to the handle unit, as will appear.

The handle unit, preferably made of suitable strap metal, comprises a grip portion 12 and connected extensions 13 and 14. Extension 14 terminates in an eye 15 adapted to be engaged hingedly with link 10, so that said handle may be moved through an arc of ninety degrees (90°) with respect to said link member.

A sleeve 16 is formed on a latch member 17 and adapted to be slidably positioned on extension 14. The latch member 17 is provided with a downwardly depending portion 18, at one end thereof, which serves as a finger-hold therefor. The opposite end of said latch 17 is adapted to be inserted through slits 8 when the handle is in side position with respect to the container, and through slits 9 when the handle is in bail position, in order to lock the said handle unit against movement relative to the container.

Figure 3:
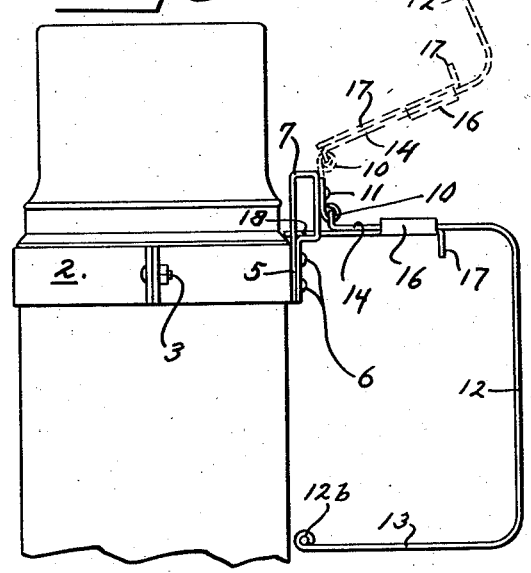
Fig. 3 is a side elevation with the handle locked in side position, and showing intermediate position of the handle in broken lines.
Figure 4:
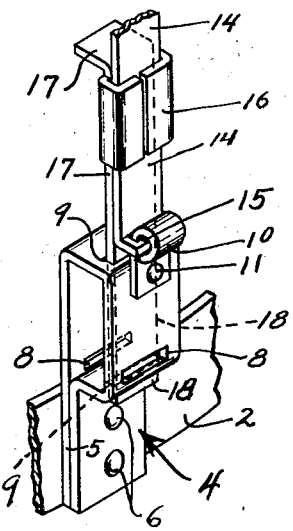
Fig. 4 is a fragmentary perspective of the handle-locking mechanism in the position shown in Fig. 1.

To transpose the handle from bail to side position, latch 17 is removed from slits 9, the handle unit is pivoted approximately ninety degrees (90°) by reason of the hinge connection formed by link 10 and eye terminal 15; the pivotally connected link 10 and hingedly connected handle unit are swung downwardly through an arc of approximately one hundred eighty degrees (180°) to the position shown in Fig. 3, and latch 17 is then inserted in slits 8, thereby locking the handle in side position.

To transpose the handle from side to bail position, latch 17 is removed from slits 8, the pivotally connected link 10 and hingedly connected handle unit are swung upwardly through an arc of approximately one hundred eighty degrees (180°), the handle unit is pivoted ninety degrees (90°) through the hinge connection formed by link 10 and eye terminal 15, as indicated in Fig. 3 showing the intermediate position in broken lines, and latch 17 is then inserted in slits 9. Obviously, the handle could terminate as at 12ª, Fig. 1, rather than as shown at 12ᵇ in full lines.

Figs. 5, 6 and 7 illustrate a simpler form of the invention, which embraces an inverted, substantially U-shaped member, with one leg preferably round in cross section and movable up and down and turntable sidewise in a sleeve member so as to be capable of movement from a side handle position on, and extending out from, a container to which it is attached to a bail position above and across the top of the container; the set screw locking the movable member in either of its operative positions.

Figs. 5, 6 and 7 illustrate the modification, wherein the handle unit is illustrated as preferably U-shaped. The handle unit consists of a grip portion 30 and connected extensions 31 and 32. It should be stated that the handle is shown as U-shaped for purposes of illustration as it is obvious that any suitably shaped handle could be utilized instead, one example being shown by dotted lines a—a in Fig. 5 where the extension 31 could be omitted.

The handle unit is affixed to the container A through the medium of a base member or band 33, which is removably fitted around the container and suitably secured thereto, as at 34. The band 33 is equipped with a sleeve 35 for slidable and rotatable reception of extension 32. The sleeve 35 is provided with a threaded bore, carrying a set screw 36 having a knurled head. The set screw, when tightened, is adapted to engage a slot provided in said extension, as at 38 and 39, to lock the handle against sliding and/or rotation when the handle is in a set position. The side position slot 38 is formed in the extension 32 spaced from the junction of grip portion 30 and extension 32 on the inner side of the handle unit.

The bail position slot 39 is formed in extension 32, spaced from the stop pin 40 and diametrically opposed to slot 38. The radially projecting pin 40 or other suitable stop means is provided on the free end of extension 32 to prevent the said extension from becoming disengaged from the sleeve.

If it is desired to transpose the handle from side to bail position, as represented in Fig. 5 in full lines, the set screw 36 is disengaged from slot 38, the handle unit is lifted and extension 32 slides upwardly through sleeve 35 to the position shown in broken lines in Fig. 5, the handle is rotated through an arc of approximately one hundred eighty degrees (180°), and the set screw 36 and slot 39 are registered and engagement made, thereby locking the handle in bail position with respect to the container. By loosening the set screw, rotating the handle through a half circle and depressing the extension 32 through sleeve 35, the handle unit is transposed from bail position to side position, as shown in Figs. 6 and 7. The set screw is then registered with slot 38 and, when tightened, locks the handle unit in side position.

It is obvious that a multiplicity of slots may be provided in extension 32 in order to facilitate registry of set screw and slot. Registry may be simplified by spacing the slots 38 and 39 from stop pin 40 and the junction of extension 32 and hand grasp 30, respectively, so that when sleeve 35 contacts stop 40 or the aforesaid junction the said set screw is thereby horizontally aligned with the slot position.

While the invention has been illustrated and described in certain detail of embodiment for illustrative purposes, it is not intended that the invention be limited thereto but that modifications and changes in details of construction may be incorporated within the spirit and scope of the appended claims.

I claim:

1. A substantially U-shaped handle for containers and the like comprising a grip portion and connected extensions, one of said extensions being rotatable about a vertical axis and vertically movable within and carried by a sleeve carried by said container, an adjustable set screw mounted on said sleeve, and slots adapted to be engaged by said set screw formed in said extension adjacent to the opposite ends thereof and diametrically opposed to one another, the slot adjacent to the junction of said grip portion and said extension carried in said sleeve being provided on the inner side of said handle.

2. A two-position handle attachment for containers and the like comprising in combination with a container, a bail and handle unit with connected extensions, a band embracing the container, a sleeve mounted on said band and supporting one extension of said bail and handle unit, said bail and handle unit being rotatable about a vertical axis and vertically adjustable within said supporting sleeve whereby said bail and handle unit may be adjusted from a bail position over said container to a handle position at the side of said container, engagement slots in said supported extension of said bail and handle unit adjacent to the opposite ends thereof and diametrically opposed with respect to each other and releasable locking means supported by said sleeve engaging one of said slots to secure rigidly said supported extension when said bail and handle unit is in the bail position and engaging said other slot to secure rigidly said supported extension when said bail and handle unit is in the handle position.

3. A two-position handle for containers and the like, comprising, in combination with a container, a sleeve mounted on the container, a bail and handle unit carried by said sleeve and having a first arm mounted in said sleeve for vertical adjustment to either an elevated or a lowered position and rotatable adjustment when in the elevated position, and adapted to be secured in either of said positions, said first arm having a second arm rigid with respect to said first arm extending laterally therefrom at the upper portion and which second arm is adapted to be swung about to a position over the upper end of said container when said first arm is in the extreme upper position and said unit is to be used as a bail, and said second arm being adapted to extend laterally away from said container when said first arm is in the lowermost position in said sleeve and the unit is to be used as a pouring handle, and releasable locking means associated with said sleeve for locking said unit in either the elevated or lowered position with respect to said sleeve.

4. A two-position handle for containers and the like, comprising in combination with the container a supporting sleeve mounted on said container, a bail and handle unit having a first portion mounted in said sleeve and being rotatable about its vertical axis and vertically adjustable in said supporting sleeve to an extended and upper position or to a retracted and lower position and adapted to be secured at either of said two positions, said unit having a second portion rigid with respect to said first portion, extending laterally from said first portion and adapted to constitute a bail portion when extending over the end of said container, said unit having a third portion extending generally downwardly from said second portion in spaced relation to said first portion and adapted to constitute a handle portion when said unit is in the retracted position and said second portion is not in position over the end of said container, whereby said handle portion may be used to tilt said container, and releasable locking means associated with said sleeve and engageable with said first portion of said unit whereby the latter may be secured in either of said two positions, as a bail or as a pouring handle.

LILLIAN S. WITHERSPOON.